US008108488B2

(12) United States Patent
Derechin et al.

(10) Patent No.: US 8,108,488 B2
(45) Date of Patent: Jan. 31, 2012

(54) SYSTEM AND METHOD FOR REDUCING BANDWIDTH REQUIREMENTS FOR REMOTE APPLICATIONS BY UTILIZING CLIENT PROCESSING POWER

(75) Inventors: Jacob Derechin, San Diego, CA (US); Luis Derechin, Chula Vista, CA (US)

(73) Assignee: JackBe Corporation, Wilmington, DE (US)

( * ) Notice: Subject to any disclaimer, the term of this patent is extended or adjusted under 35 U.S.C. 154(b) by 2191 days.

(21) Appl. No.: 10/299,260

(22) Filed: Nov. 18, 2002

(65) Prior Publication Data

US 2004/0109470 A1 Jun. 10, 2004

(51) Int. Cl.
*G06F 13/00* (2006.01)
(52) U.S. Cl. .......................... 709/219; 709/223; 715/205
(58) Field of Classification Search .................. 709/217, 709/219, 223, 203, 227, 228; 715/205, 513
See application file for complete search history.

(56) References Cited

U.S. PATENT DOCUMENTS

| | | | |
|---|---|---|---|
| 6,012,083 A * | 1/2000 | Savitzky et al. ............... 709/202 |
| 6,272,484 B1 | 8/2001 | Martin et al. |
| 6,295,645 B1 | 9/2001 | Brewer et al. |
| 6,477,550 B1 | 11/2002 | Balasubramaniam et al. |
| 6,507,867 B1 | 1/2003 | Holland et al. |
| 6,546,554 B1 | 4/2003 | Schmidt et al. |
| 6,622,168 B1 * | 9/2003 | Datta ............................ 709/219 |
| 6,687,745 B1 | 2/2004 | Franco et al. |
| 6,691,176 B1 * | 2/2004 | Narin et al. .................... 719/318 |
| 6,782,431 B1 | 8/2004 | Mukherjee et al. |
| 6,792,605 B1 | 9/2004 | Roberts et al. |
| 6,807,559 B1 | 10/2004 | Budhiraja |
| 6,892,067 B1 * | 5/2005 | Sharma et al. ................. 455/419 |
| 6,948,151 B2 * | 9/2005 | Gerken ........................... 717/108 |
| 2002/0092012 A1 * | 7/2002 | Shah ............................. 717/170 |
| 2002/0097267 A1 * | 7/2002 | Dinan et al. ................... 345/757 |
| 2002/0143800 A1 * | 10/2002 | Lindberg et al. .............. 707/201 |
| 2002/0156815 A1 * | 10/2002 | Davia ............................ 707/517 |
| 2003/0009488 A1 * | 1/2003 | Hart, III ........................ 707/500 |
| 2003/0055723 A1 | 3/2003 | English |
| 2003/0233404 A1 | 12/2003 | Hopkins |
| 2004/0010563 A1 * | 1/2004 | Forte et al. .................... 709/215 |
| 2004/0117439 A1 | 6/2004 | Levett et al. |

(Continued)

FOREIGN PATENT DOCUMENTS

EP 1087303 A2 3/2001

(Continued)

OTHER PUBLICATIONS

Liska, Allan, *Mastering JavaScript: Part 2, Further Studies in Advanced Scripting*, DDC Publishing, 1998-1999, pp. 102-110.

(Continued)

*Primary Examiner* — Viet Vu (57) ABSTRACT

A method and system for reducing transmitted code for remote application forms. First code to link one or more functions to a remote application is received at a client digital processing system (DPS). Each function contains instruction code to generate object construction code and a set of object parameters. The object construction code is used to create a corresponding object. The one or more functions are linked to the remote application form. Second code is received to call one or more of the functions. One or more of the functions is called to construct one or more objects at the client DPS. The constructed one or more objects is presented as part of the remote application form based upon the object parameters.

17 Claims, 9 Drawing Sheets

U.S. PATENT DOCUMENTS

2004/0119740 A1    6/2004    Chang et al.
2004/0148375 A1    7/2004    Levett et al.
2004/0216042 A1    10/2004    Consolatti et al.

FOREIGN PATENT DOCUMENTS

WO      WO 0207009 A1    1/2002
WO      WO 03065242 A1    8/2003

OTHER PUBLICATIONS

Wills, Craig, et al., *N for the Price of 1: Bundling Web Objects for More Efficient Content Delivery*, http://www10.org/cdrom/papers/477/ pp. 1-14.

Chan, Choon Mun, et al., *Cache-based Compaction: A New Technique for Optimizing Web Transfer*, Networking Software Research Department Bell Laboratories, 1999 IEEE, pp. 1-9.

Gosselin, Don, *JavaScript Comprehensive*, Course Technology, Thomson Learning, 2000, pp. 24-28.

Flanagan, David, *JavaScript the Definitive Guide*, Second Edition, O'Reilly & Associates, 1997, pp. 159-160.

Wille, Christoph, et al., *SAMS Teach Yoursel Active Server™ pages in 24 hours*, Sams Publishing, 1999, pp. 375-381.

International Search Report for PCT Application No. US03/37021, filed Nov. 17, 2003, 5 pages.

\* cited by examiner

SYSTEM AND METHOD FOR REDUCING BANDWIDTH REQUIREMENTS FOR REMOTE APPLICATIONS BY UTILIZING CLIENT PROCESSING POWER

FIELD

Embodiments of the invention relate generally to the field of remote applications, and more specifically to a system and method to reduce the transmitted data for such applications.

BACKGROUND

The Internet has become a backbone of communication with a vast repository of information available in various formats. Many companies are developing various applications for use on the Internet to facilitate real-time decision-making processes (e.g., transactional applications). In general these remote applications encompass any bi-directional or unidirectional access of remote data.

The full potential of the Internet for such purposes remains unfulfilled due to problems with its performance and reliability. One of the Internet's performance limitations in particular is the bandwidth problem. Modern remote applications require the transmission of a great deal of information at a high rate. When such applications are used over low-bandwidth data transmission media, such as typical telephone lines, the applications may not function properly and/or may result in lengthy wait times. This problem is also evident in high-bandwidth environments supporting many users (i.e., having a low bandwidth-to-user ratio). For purposes of this disclosure, the term "low bandwidth will refer to actual low bandwidth or a low bandwidth/user ratio. Bottlenecks may be caused by a low bandwidth/user connection, the infrastructure of the Internet Service Provider (ISP), the gateway to the Internet backbone, or the content provider's Web server and/or application server. Eliminating these problems may be prohibitively expensive or impractical. For example, not only is increasing bandwidth expensive, but it may not be practically possible in some areas that lack the infrastructure to do so.

The increasing bandwidth requirements are due to the increasing complexity of the data transmitted and to how the Internet exchanges information. The Internet may typically use hypertext mark-up language (HTML) and its related formats such as extensible mark-up language (XML), dynamic HTML (DHTML). The Internet also may use Hyper Text Transfer Protocol (HTTP), File Transfer Protocol (FTP), and other associated Transmission Control Protocol/Internet Protocol (TCP/IP) based communications protocols.

HTML defines the syntax and placement of special, embedded, directions that instruct a web browser on how to display the contents of a document which is made up of one or more HTML text files or associated media files, or other embedded files of any number of formats including text, images, and other support media. HTML instructs a web browser client application on how to make a document interactive through special hypertext links or through embedded programs like Java applets, which connect a document with other documents, as well as with other Internet resources. In addition, embedded programs can and often do contain their own interactive logic in the form of executable code and the associated resources.

A server digital processing system (server DPS) typically runs a web server and/or application server program to make documents, typically hypertext documents in the HTML language, available. Web servers and/or application servers typically have a standard interface for running external programs, such as Common Gateway Interface (CGI), Java servlets, Java server pages (JSPs) and Active server pages (ASPs) or other server-side solutions. Such programs handle incoming information requests and return the appropriate document or generate a document dynamically. For example, a gateway might receive queries, determine a response, and translate the response into a page of HTML so that the server DPS can send the result to a client digital processing system (client DPS). The client DPS typically runs a web browser (a program to allow retrieval and display of information from the server DPS). Server-side technologies such as JSP and ASP employ scripting engines or Java that process commands written in a scripting language or Java.

The web server and/or application server and the web browser communicate using HTTP. In HTTP, the web browser establishes a connection to a web server and/or application server and sends an HTTP request message to the server DPS. In response, the web server and/or application server checks for authorization, performs any requested action and returns an HTTP response message containing an HTML document resulting from the requested action, or an error message. The web server and/or application server then retrieves the document and returns it in an HTTP response message to the Web browser.

The client DPS may petition the server DPS for access to an application document, for example a transactional application form. The client DPS's petition causes the entire form to be constructed on the server DPS. The form is then packaged and transmitted to the client DPS. Typically the client DPS receives the HTML code and parses and renders the form at the client DPS.

FIG. 1 illustrates a process in which a client DPS requests and receives a remote application form from a server DPS in accordance with the prior art. Process 100, shown in FIG. 1, begins at operation 105 in which the client DPS requests access to a remote application form. The request (petition) may be made, from the client DPS to the server DPS, in a variety of ways including via Internet, Intranet, Extranet, local area networks (LANs), wide area networks (WANs), as well as others, and combinations thereof. For convenience the data transmission path between the client DPS and sever DPS is referred to as the "cloud". The transmission of the petition through the cloud is limited by available bandwidth. Because the petition is typically only a small amount of data, this bottleneck may not cause significant delay.

At operation 110 the server DPS receives the petition. The petition is received by the web server/application server of the server DPS.

At operation 115 the server DPS determines whether the petition is for a standard interface file (for purposes of this illustration a JSP file). If the petition is a JSP file, at operation 116, the server performs a JSP processing operation. The JSP file is retrieved and passed to the servlet engine. If the JSP has not been previously instantiated, the servlet engine parses the JSP file and generates servlet source code. The servlet engine then compiles the source code and instantiates the servlet. At operation 117 the servlet then outputs standard HTML code.

If at operation 115 the petition is not a JSP file, the server DPS obtains the HTML code from the virtual directory at operation 118.

At operation 120 the HTML code (from the JSP servlet or from the virtual directory) is transmitted from the server DPS, through the cloud, to the client DPS. This HTML code is fairly heavy and may cause lengthy delay in the transmission especially for low bandwidth/user environments.

At operation 125 the client DPS receives the HTML code. The HTML code is received at the client DPS browser and may be buffered prior to being parsed and rendered. This buffering adds to the delay in presenting the remote application form.

At operation 130, after all of the transmitted code has been parsed and rendered, the remote application form presentation is complete on the client DPS.

Due to how HTML is structured, much of the code transmitted in such a scheme is related to the formatting structure of the document. This amounts to a tremendous amount of transmitted data that does not provide user-specific benefit. This situation has been addressed in several ways with varying degrees of success. For example, to avoid transmitting a document to the client DPS each time, terminal servers emulate a screen at the client DPS. This opens a client session on the server DPS where the application is actually running on the server DPS and only screen emulations are transmitted to the client DPS. That is, none of the presentation code or logic of a typical web-page transmission is included. The client DPS has an application emulator and is transmitting only interaction with the form (i.e., typed input and/or mouse movement). With terminal servers, various algorithms are used to reduce the required data transmission. Terminal servers allow for reduced processing power on the client DPS, but processing requirements are dramatically increased on the server DPS. Such schemes do not provide significant relief for very low bandwidth/user media such as typical (analog) telephone lines and have numerous other drawbacks. One such drawback is that the initial setup may require data transmission on the order of several megabytes (MB) which is installed at the client DPS as a plug-in, an object, or directly to the client DPS hard disk (i.e., not to the browser cache). This installation is, therefore, across a secure barrier. Such installation requires explicit user permission, alters the configuration of the client DPS, and produces a possibility of conflict and the perception of vulnerability to corruption. Additionally, terminal servers are system specific. That is, because an installation on the client DPS is required, terminal servers are not system independent. Moreover, where a user lacks administrative rights to be able to install the initial components or the terminal server cannot pass through firewalls or proxies, the terminal server may be rendered unusable.

Another attempt to reduce the amount of required data transmission in transactional application forms are installation schemes that create an environment on the client DPS to alter interaction with the server DPS. An example of such is the Java Virtual Machine (JVM), which is a self-contained operating environment to run Java applets. The idea behind the JVM is to install an environment on the client DPS that is operating system and browser independent. This has the potential of being able to reduce data transmission, because it may reduce the need to continually transmit document-structuring code.

However, JVM also has the drawbacks of the terminal server in that an initial installation is required. For JVM this may be as large as 11 MB because JVM requires objects and extra classes. JVM not only installs its overall environment, but each application requires its own specific environment (i.e., requests additional classes from the server). Because more data has to be accessed, the applications are sluggish. Moreover, JVM requires substantially more client DPS processing power. JVM may work well for small, specifically focused, applications but, in general, JVM still requires so much code that it does not significantly reduce the amount of required data transmission for transactional application forms.

Another example of the excessive amount of data transmitted via the cloud for remote application forms is the submission and data validation process. Many remote applications require that user input data be validated by the server DPS. Typically the user must submit the completed form and the server DPS must receive the completed form prior to attempting to validate specific inputs. If there was an error in completing the form, the entire page creation process must be employed to recreate the page adding values to fields and error messages where appropriate. If no error is detected in the user input data, the server DPS creates a page containing the validated information. This page is then transmitted to the client DPS via the cloud, for user verification. If the user submits the form with verification, the corresponding database process and other tasks may proceed. If the user is unable to verify the data, the page creation process must be employed as described above. This process not only requires a substantial amount of data transmission via the cloud, but also results in significant wait-time as pages are transmitted and/or recreated due to erroneous input.

Another disadvantage of typical remote applications is that they are typically poorly presented. This "look and feel" or user friendliness aspect is related to the fact that typical remote applications operate in batch mode and cannot interact with the server in real time. Typically the forms are quite long, causing the user to have to scroll, and provide no feedback from the server until the form is complete. Typical remote applications cannot operate in "chatty" mode as the continual process of closing, transmitting, and reopening the page would cause a delayed and disconcerted presentation.

What is needed is an effective system and method for reducing data transmissions between the client DPS and the server DPS via the cloud. Such data transmissions may include the transmission of data files or a collection of data files, including the transmission of text, audio, media, embedded programs, executable code, or other data that is published at a host server DPS. Such a system should reduce data transmission during accessing and presentation of remote application forms as well as for submission and data validation.

Preferably such a system should not require installation on the client DPS (i.e., would employ zero-install technology) and should not modify the secure side of the client DPS. Such a system should also pass through proxies and firewalls. Moreover, such a system should provide a user-friendly interaction (e.g., graphical user interface and "chatty mode") for remote applications.

The need for such a system is most apparent where client DPS is accessing moderate to high-bandwidth data applications via low bandwidth/user media, though such a system should augment any bandwidth capacity.

SUMMARY

Embodiments of the present invention provide methods and systems for reducing transmitted code for remote application forms. First code to link one or more functions to a remote application is received at a client digital processing system (DPS). Each function contains instruction code to generate object construction code and a set of object parameters. The object construction code is used to create a corresponding object. The one or more functions are linked to the remote application form. Second code is received to call one or more of the functions. One or more of the functions is called to construct one or more objects at the client DPS. The constructed one or more objects is presented as part of the remote application form based upon the object parameters.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings:

FIG. 1 illustrates a process in which a client DPS requests and receives a remote application form from a server DPS in accordance with the prior art;

FIG. 2 illustrates a network of digital processing systems (DPS) in which reduced data transmission enabled applications may be transmitted, received, and processed in accordance with one embodiment of the invention;

FIG. 3 is an architectural overview diagram for a system in accordance with one embodiment of the invention;

FIG. 4 is a process flow diagram illustrating a process in which a client DPS accesses and presents a reduced data transmission enabled remote application in accordance with an embodiment of the invention;

FIG. 5 is a process flow diagram illustrating a process in which user input data is validated against a server DPS database in accordance with one embodiment of the invention.

FIG. 6 is a process flow diagram illustrating a process in which a remote application form is refreshed in accordance with one embodiment of the invention;

FIG. 7 is a process flow diagram illustrating a process in which user data input type validation and field completion validation are accomplished on the client DPS in accordance with one embodiment of the invention;

FIG. 8 illustrates an embodiment of a digital processing system that may be used for the server DPS or client DPSs, in accordance with an embodiment of the invention.

DETAILED DESCRIPTION

Overview

An embodiment of the present invention significantly reduces the amount of required code transmitted between the server DPS and the client DPS for a remote transactional application form while maintaining complete and additional functionality. Though specific examples are described, for the purposes of delimiting the breadth of the invention, the term form refers generally to any combination of objects created for use on a remote application. For one embodiment this is accomplished with reduced data transmission to the client. For one embodiment, after a client DPS accesses a remote application form, the server DPS transmits a core library, consisting of a number of functions, to the client DPS. The core library is stored on the browser cache of the client DPS. The core library includes a set of functions referred to as a generic mini-assembler (GMA). The GMA is used to construct generic (e.g., commonly used) objects on the client DPS. That is, code within the initial transmission calls the functions of the GMA to produce the HTML code to construct the generic objects. This production of the HTML code and the construction of the objects takes place on the client instead of the server DPS. The objects are portions of the transactional application form and may be various fields of information to be exchanged including text, text area, check boxes, etc. For one embodiment, when the document is created, the program logic of the standard interface program requests additional objects required by the particular application, and requests the functions necessary to construct these objects from the server DPS. The function required to construct such objects are referred to as specific mini-assemblers (SMAs).

It is an intended advantage of one embodiment of the invention to reduce the amount of transmitted data for remote applications. It is another intended advantage of one embodiment of the invention to provide fully functional transactional applications over relatively low bandwidth/user media. It is another intended advantage of one embodiment of the invention to accomplish a majority of the remote application form processing at the client DPS thereby liberating server DPS processing resources. It is another intended advantage of one embodiment of the invention to provide transactional application forms with greatly reduced initial download and no installation on the client (i.e., to employ zero-install technology). It is another intended advantage of one embodiment of the invention to provide access to remote applications without modifying the secure side of the client DPS. It is another intended advantage of one embodiment of the invention to provide a user-friendly interaction for remote applications. It is another intended advantage of one embodiment of the invention to provide functions to the client DPS for the construction of application objects on the client DPS. It is further intended advantage of one embodiment of the invention to initially provide only those functions necessary to construct generic objects, provide validation and provide a user-friendly interaction for remote applications.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

System

Figure 1:
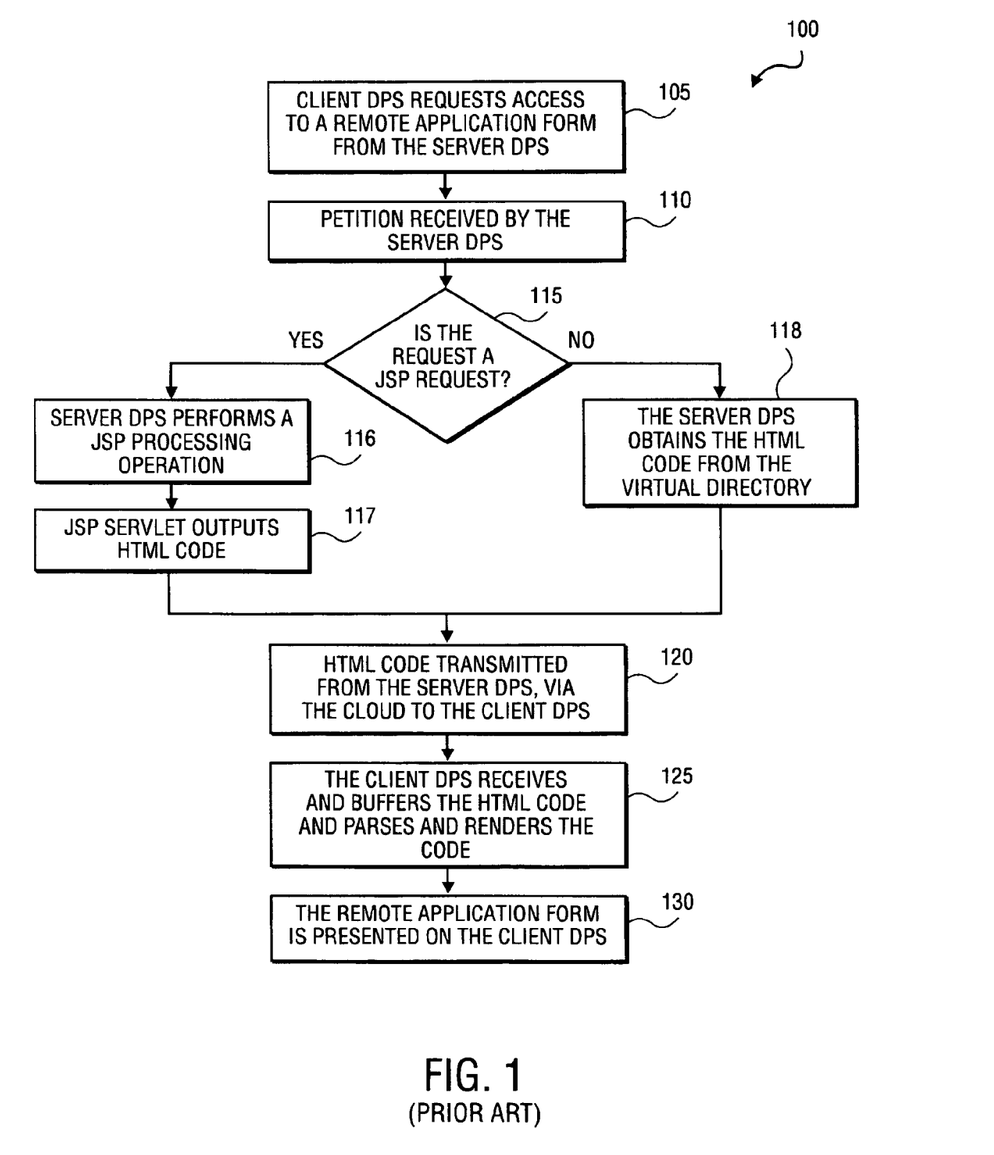
Figure 2:
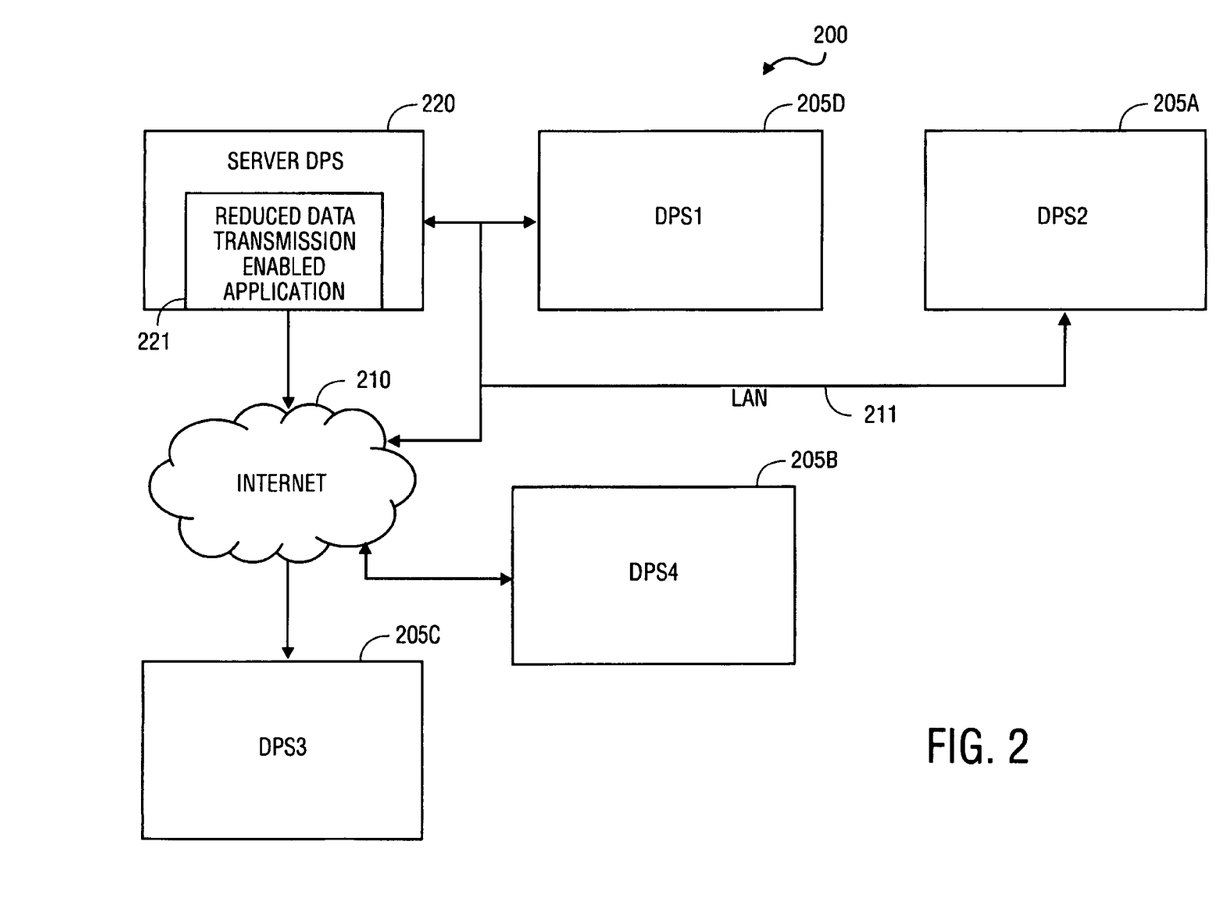

FIG. 2 illustrates a network of digital processing systems (DPS) in which reduced data transmission enabled (RDTE) applications may be transmitted, received, and processed in accordance with one embodiment of the invention. The network of DPSs 200 includes a plurality of client DPSs, shown as client DPSs 205a-205d, coupled to one or more server DPSs, shown as server DPS 220. The server DPS 220 and client DPSs 205a-205d are configured to communicate a plurality of various data files. For example, server DPS 220 has stored upon it a reduced data transmission application 221 for access by a client DPS in accordance with an embodiment of the invention. The data files may pertain to transactional application forms or may be any combination of a number of different types of files including, for example, video, audio, graphics, text, multi-media or the like. For example, the data files may be audio/video files, such as programs with moving images and sound. Data may be communicated between the server DPS and the client DPSs through any type of communications network through which a plurality of different devices may communicate such as, for example, but not limited to, the Internet, a wide area network (WAN) not shown, or a local area network (LAN), an intranet, or the like. For example, as shown in FIG. 2, client DPSs 205a and 205d are coupled to the server 220 through LAN 211, while client DPSs 205b and 205c are coupled to the server 220 through Internet 210 which is a network of networks having a method of communicating data as described above and well known to those skilled in the art. The communication links coupling the server DPS to client DPSs need not be a direct link, but may be indirect links including but not limited to broadcasted wireless signals, network communications or the like.

An embodiment of a digital processing system that may be used for the server DPS 220, or client DPSs 205a-205d, in accordance with an embodiment of the invention is described below in reference to FIG. 8.

Figure 3:
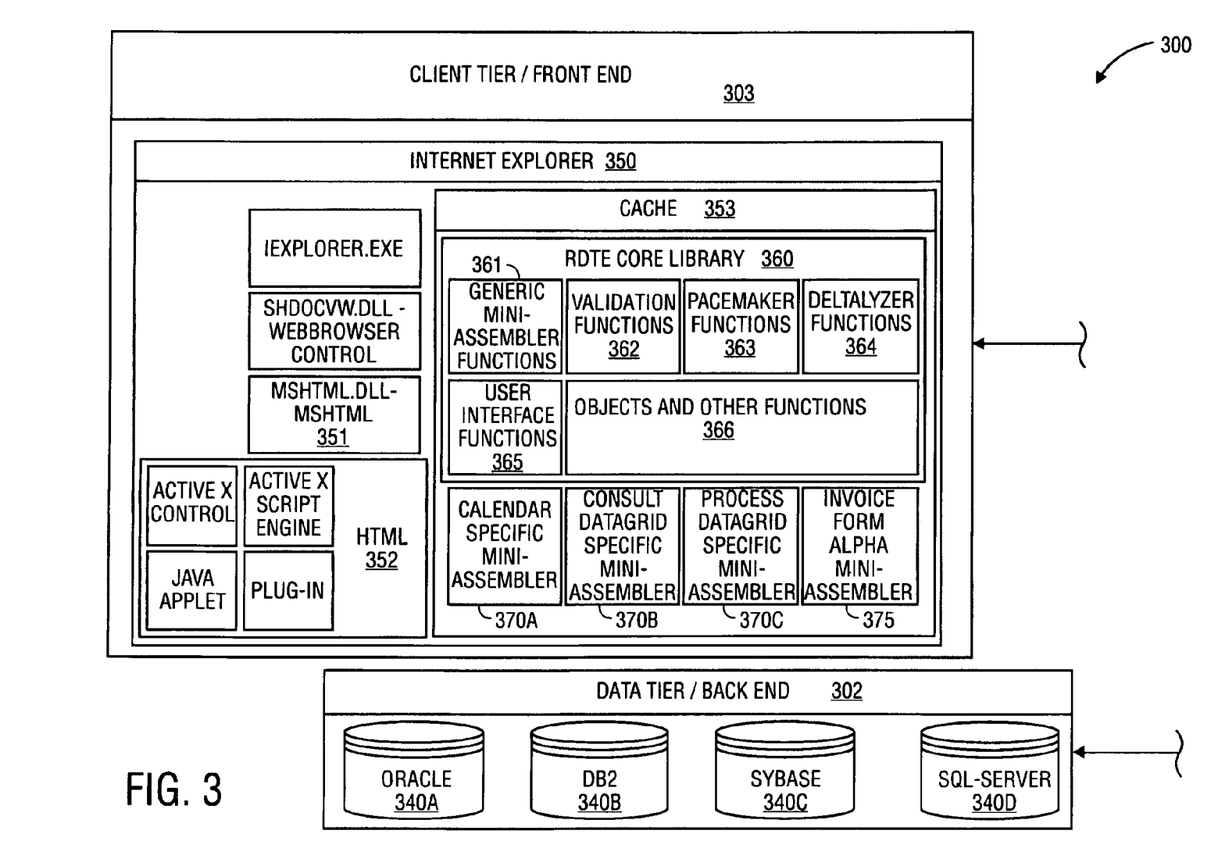

FIG. 3 is an architectural overview diagram for a system in accordance with one embodiment of the invention. The exemplary system 300, shown in FIG. 3, is shown as a Java-centric environment (e.g., Java 2 Platform Enterprise Edition (J2EE)), this is for illustrative purposes only and the invention should not be construed as limited to such.

System 300 includes exemplary embodiments of a server (middle) tier 301, a back end 302, and a client tier 303, as further described below.

Server tier 301 includes an application development environment, for example, J2EE web container 310. Web container 310 includes HTML code 311 and RDTE remote application HTML code 311a; servlets 312 and RDTE servlets 312a; JSPs 313 and RDTE JSPs 313a; and CGIs 314 and RDTE CGIs 314a. Web container 310 also includes RDTE remote application core library 315 and other functions 316, discussed below.

Server tier 301 also includes an application program 320 for running various components 321, setup through the component architecture (e.g., Enterprise Java Beans) that stores platform logic. These components may provide, among others, memory management and security functions. The application program 320 may include an inter-computer messaging API 322 that allows the creation, management, and communication of various data files, as well as a database access API 323 (e.g., Java DataBase Connectivity) to provide the application with database access.

Server tier 301 also includes a web/application server 330 that provides the RDTE remote application pages to the client tier 303 and handles the application operations between the server tier 301 and the backend 302.

Backend 302, which provides database management functions, among others, includes various database environments 340a-340d for responding to user queries.

Client tier 303 includes a client DPS web browser 350 that includes HTML parsing and rendering software 351, scripting functions 352, and browser cache 353. Stored on the browser cache 353 is core library 360, which is a library of functions used to create the most common objects of an application page. This library is transmitted from the server DPS to the client DPS upon initial access of a remote application in accordance with one embodiment of the invention. The core library 360 includes a GMA 361, validation functions 362, pacemaker functions 363, deltalyzers functions 364, user interface functions 365, and other functions and objects 366 (e.g., date functions, array functions, etc.). For one embodiment, the core library is approximately 15 kilobytes and is capable of constructing many of the most commonly used HTML objects. Appendix A, attached hereto, includes exemplary functions for constructing an input text object or an input password object in accordance with one embodiment of the invention. For one embodiment such functions are contained in the GMA.

Other functions, that are not part of the core library, may be initially transmitted by the server DPS to the client DPS and stored on the browser cache. For example, as shown in FIG. 3, SMAs 370a-370c are stored on the browser cache 360. Browser cache 360 also includes an alpha mini-assembler (AMA) 375, which is a form-specific function that may include calls to the GMA or SMAs. Because SMAs and AMAs are not part of the core library, they are only transmitted if the programming language includes a call to them.

Because all of the functions of the RDTE remote application are stored on the client DPS cache browser, the invention avoids the disadvantages of client-side installation.

The various functions of the core library as well as SMAs and AMAs are discussed in greater detail below.

Generic Mini-Assembler

The generic mini-assemblers (GMAs), which are part of the core library, are code libraries that provide small functions, which, in conjunction with parameters, allow the client DPS to assemble the HTML code for commonly used objects (e.g., text, text area, check boxes, etc.). For one embodiment, the GMA parameters generate the necessary HTML code for most of the necessary objects for the particular page. This reduces the amount of transmitted data because the server no longer has to transmit all of the HTML code for each object. The GMA also adds validation attributes (e.g., data types, required fields, etc.) that are used for a validation process discussed further below. This process takes place within the same environment that runs on the client, thus eliminating the need for installing a new environment on the client. Additionally, or alternatively, the GMA may contain instructions for communicating directly with the document object model (DOM) to create objects on the client without generating the HTML code. In such a case the server calls a function, which is defined in the GMA, to create a particular object.

Specific Mini-Assemblers

The GMA is designed to contain only the functions needed to create the most commonly used objects, and therefore, the GMA may not contain parameters to generate the HTML code to produce some objects that are required for a particular form. This may be because the object is simply not used frequently enough to be included in the GMA. That is, in order to transmit as little data as possible, the GMA must only encompass the most elemental objects. For such less commonly used generic objects, a call to a specific mini-assembler (SMA) may be included in the RDTE remote application code by the programmer and transmitted from the server DPS to the client DPS upon access of the form by the user. The SMAs are specific to a generic object, but one that is not used frequently enough to be included in the GMA. For example, the parameters for generating a calendar may be designated an SMA (i.e., not included in the GMA) because a calendar is not always needed. In one embodiment the SMA for creating a calendar is approximately four kilobytes.

The client DPS will request an SMA only if the programmer has included a call to the particular SMA in the programming logic (e.g., in the JSP), that is, if the programmer has determined that the SMA is required for the particular form. After receiving the GMA, the client DPS determines what objects are required when the form is created and then petitions the server for the required SMAs. This helps to keep the size of the core library to a minimum and reduces the amount of transmitted data.

Alpha Mini-Assemblers

Alpha mini-assemblers (AMA) have the static portion of a specific form. The function in an AMA may include a calling to a function in the GMA (generic object) or a calling to a function in an SMA (specific object). For example, the function of an AMA may include a calling to a text element or to a calendar, if this was required for a specific form. The system of the invention is capable of working on many different environments (e.g., JSP, ASP, etc.). Therefore, there would have to be an environment-specific document such as a JSP or an ASP document on the server DPS that contains programming logic to use a specific AMA for a particular form. The AMAs may be created manually or through use of an integrated programming environment (i.e., integrated development environment (IDE)). Deltalyzer functions, discussed below, allow for the insertion of values into the static objects of the AMA.

Deltalyzers

An additional mechanism may be employed to further reduce required data transmission known as deltalyzing the form. An AMA for a form, containing all of the static portions of the form, is created. Once such an AMA for a particular form has been called and is resident on the client DPS, the static portions of the form may be accessed from the client DPS browser cache so that there is no need for the server DPS to retransmit this data. Upon subsequent use of the particular form, the server DPS transmits only the dynamic data that interacts with the particular AMA. This combination of the AMA containing the static portion of a form and the dynamic information that interacts with the AMA is called a deltalyzer. The deltalyzers may likewise be created manually or through use of an IDE.

The concept of the deltalyzers is to reduce data transmission by sending only the dynamic portion of an interactive form where the static portion has already been transmitted and is available on the client DPS. The dynamic structure may include, for example, specific names, telephone numbers, dates, and other instance-specific information, while the static structure includes the objects and fields where this information is placed within the form. For example, the first time a user accesses a particular transactional form, the server may transmit an AMA for that form that is cached on the client DPS. The server then transmits the dynamic information that interacts with the particular AMA. The next time the user calls the same form, the client DPS obtains the static portion from the browser cache and petitions the server DPS for only the dynamic portion of the particular form. Therefore, there would have to be an environment-specific document on the server DPS that contains the logic to build a specific AMA for a particular form.

Process

Figure 4:
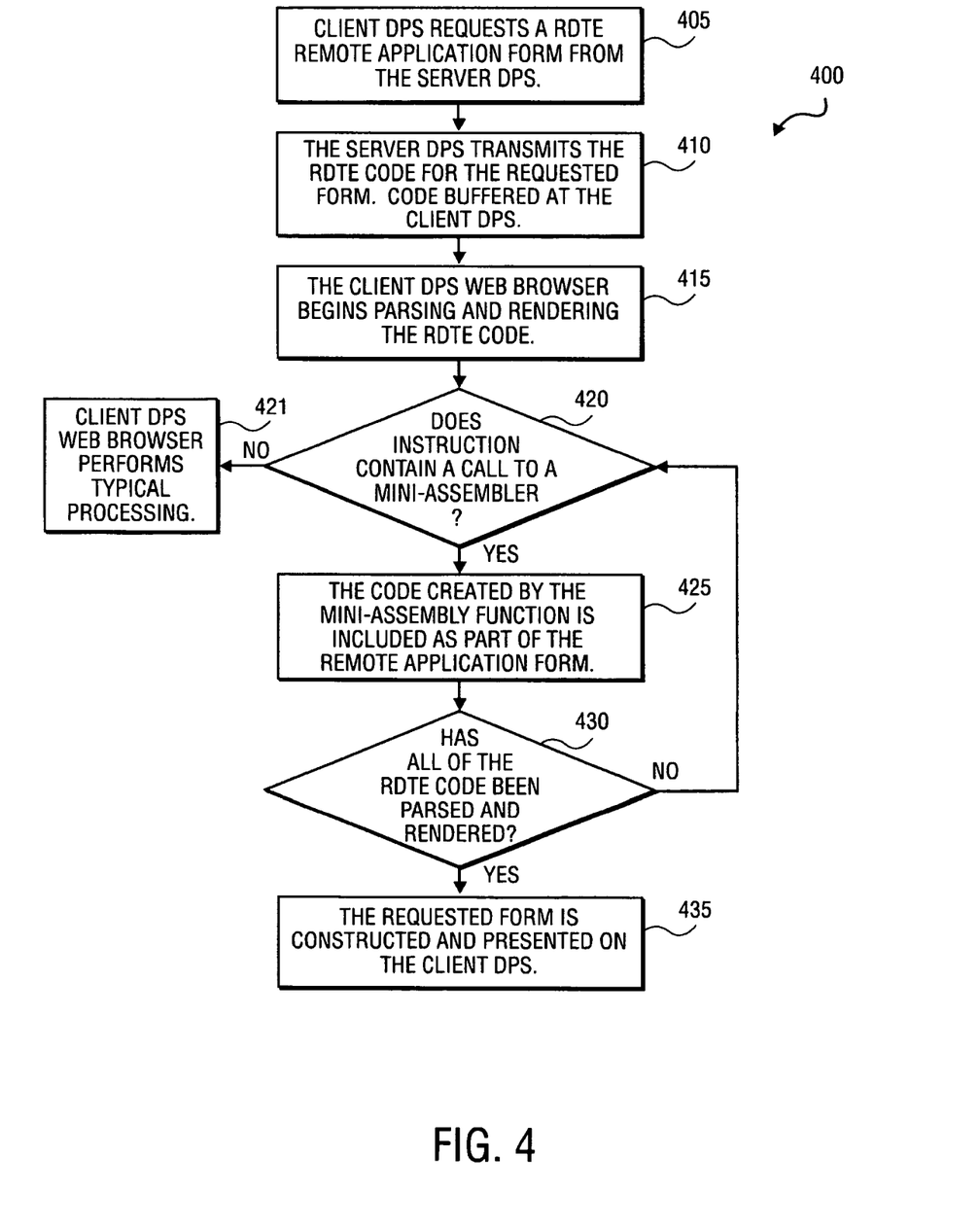

FIG. 4 is a process flow diagram illustrating a process in which a client DPS accesses and presents a RDTE remote application in accordance with an embodiment of the invention. In an alternative embodiment, an initial operation of receiving the core library at the client DPS may be included. Process 400, shown in FIG. 4, begins at operation 405 in which a client DPS requests a RDTE remote application form from the server DPS. For example, the client may request a particular transactional application form.

At operation 410, the server DPS transmits the RDTE code for the requested form via the cloud to the client DPS. Because this code will call upon the functions of the core library and applicable SMAs and AMAs, the amount of code transmitted is significantly smaller than typical prior art schemes. The code is transmitted via the cloud through the available bandwidth, but, due to its reduced size, it is transmitted faster and with less restriction. As the initially transmitted code is received, it is buffered at the client DPS web browser.

At operation 415, the client DPS web browser begins parsing and rendering the code from the buffer. The initial code contains a request to link the core library to the form. At this point, if the core library had not already been stored in the browser cache of the client DPS, the browser would request it from the server DPS. The core library is included as part of the buffer at the point where the call to the core library was made. If the form contains SMAs, the initial code contains a request to link the particular SMAs to the form, and the process described above in reference to linking the core library is repeated. Likewise, if the form is deltalyzed, the initial code contains a request to link the applicable AMA to the form and the linking process is repeated.

At operation 420, the browser continues parsing and rendering the code and determines if the instruction being parsed contains a call to a mini-assembler function. If so, the function is called and depending on the parameters it has received, the function creates the corresponding object construction code (e.g., HTML code) on the client DPS. (Instructions which do not call a mini-assembler function are processed by the browser in typical fashion at operation 421.)

At operation 425, the code created by the mini-assembler is registered as part of the form. That is, HTML code corresponding to the called functions is now included as part of the requested remote application form.

At operation 430, if there is more code in the buffer, it is parsed and rendered as described above until all of the transmitted code has been received and processed.

At operation 435, the requested form is presented on the client DPS and the user can access and use the requested form within the browser environment of the client DPS.

As a result of the process described above in reference to FIG. 4 a majority of the remote application form processing is accomplished at the client DPS thereby liberating server DPS processing resources.

Additional Processes

Through the use of mini-assemblers and client side validation processes (CSVPs) discussed below, the data transmission requirements are substantially reduced. For some transactional forms, the reduction may be as high as 80-90% compared with prior art schemes. The amount of transmitted data may be reduced even further for some applications by providing a mechanism through which the client DPS may communicate with the server DPS during the transaction (e.g., while completing a transactional application form). Basically, this ability allows a user to transfer an application from batch mode to "chatty" mode. For one embodiment, this functionality is effected through the use of "pacemakers" (PMs).

Pacemakers

HTML frames allow programmers to present documents in multiple views (e.g., independent windows or subwindows). The inline frame element (Iframe) allows a programmer to insert an HTML document within another. For one embodiment, the system of the invention uses PMs to implement hidden Iframes that provide alternative communication paths that allow a remote application to operate in "chatty" mode rather than batch mode. The PM petitions the GMA to create a new Iframe which can then be used to petition the server DPS and receive a response, after which the new Iframe may be erased from the DOM. These interactions may be time-triggered (triggered at a specific time or duration), user-triggered, or specific action-triggered. In one embodiment, to accommodate synchronous interactions, a petition queue is created so that petitions that have not been responded to by the server DPS will not be discarded upon receipt of a subsequent petition. This allows the client DPS to interact with stored data through the server DPS more efficiently.

For one embodiment of the invention, the mini-assemblers may insert one or more PMs within the code of an RDTE remote application form. The PMs are embedded in various ways depending on the form and the purpose for the data exchange. For example, PMs may be embedded variously to effect a real-time database validation process, a reduced data transmission refresh process, and emulate a normal client DPS saving process, among others. The use of PMs allows seamless intervention with the server DPS providing improved user-interaction. That is, because PMs allow only the data to be refreshed, the disconcerting effect of prior art data validation schemes caused by the form closing and reopening, is eliminated.

Database Validation Process

As noted above, PMs may be used to validate that user input data is contained within a back end database. Upon user input of data to a particular field of, for example, a transactional form, the PM causes the entered data to be sent to the server with a request to the application server to query the database and make sure the data entered is correct. Only the data contained in the specified field is transmitted from the client DPS to the server DPS (i.e., not the entire page as in typical prior art schemes). The data is sent to the server upon entry (i.e., during the transaction).

Figure 5:
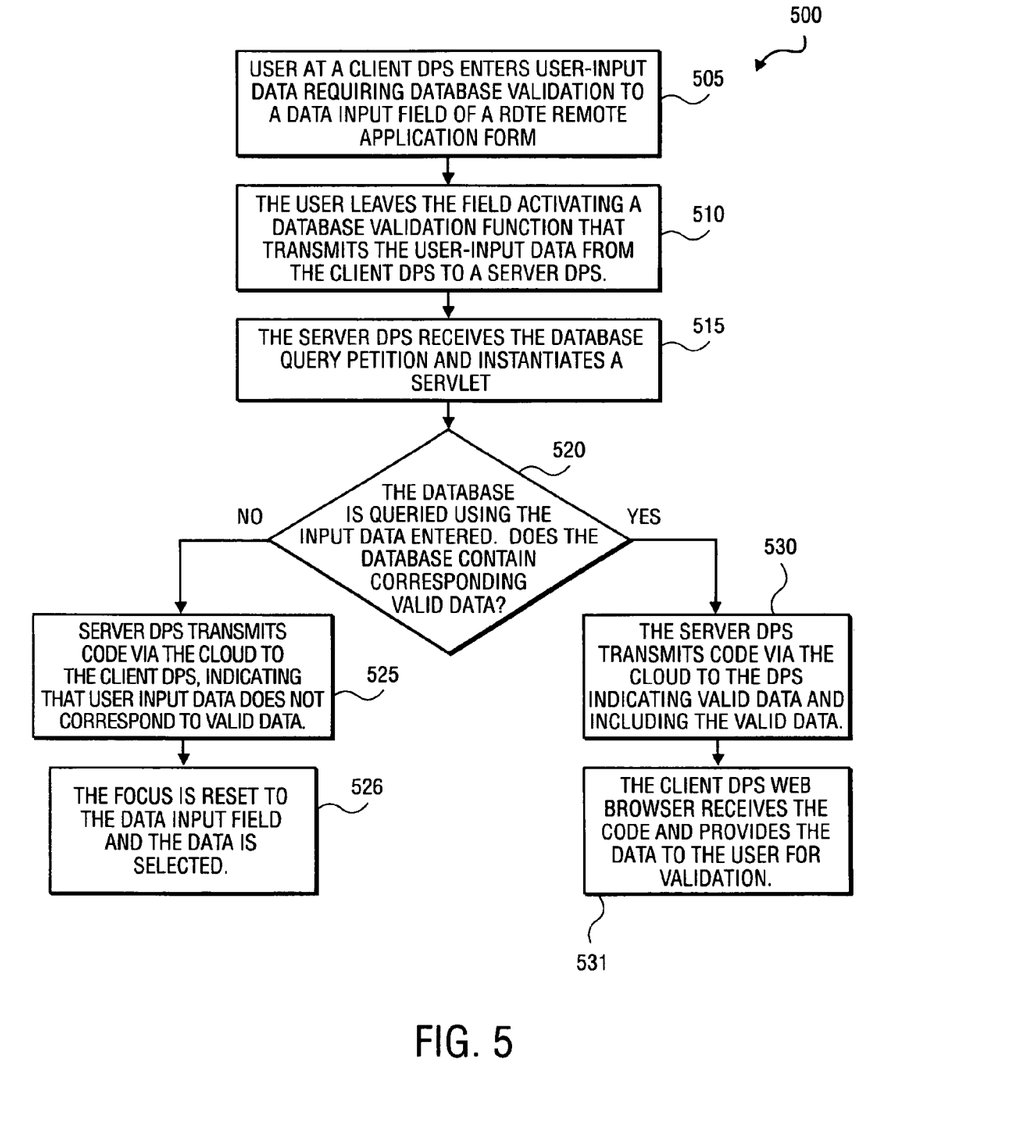

FIG. 5 is a process flow diagram illustrating a process in which user input data is validated via the server DPS through a backend database in accordance with one embodiment of the invention. Process 500, shown in FIG. 5, begins with operation 505 in which a user at a client DPS enters user-input data requiring database validation to a data input field of a RDTE remote application form that has already been accessed by the user and presented on a client DPS. For example, this data could be customer identification data (CID) associated with a particular customer name. The database validation confirms, for the user, that the CID entered corresponds to the desired customer.

At operation 510, when the user leaves the data input field, an "onchange" trigger is activated. For one embodiment, the onChange trigger is inserted into the code by the mini-assembler that created the field. The onChange trigger activates a corresponding database validation PM that transmits the user input data (e.g., CID) through the cloud to the server DPS.

At operation 515, the server DPS receives the petition. The petition is received by the web server/application server of the server DPS. If the petition is for a standard interface file, for example, a JSP file, the server DPS retrieves the JSP file from the virtual directory. The JSP file is retrieved and passed to the servlet engine. If the JSP has not been previously instantiated, the servlet engine parses the JSP file and generates servlet source code. The servlet engine then compiles the source code and instantiates the servlet.

At operation 520, the database (e.g., a customer name database) is queried using the data input by the user (e.g., CID).

If, at operation 520, the query does not return valid corresponding data (e.g., a customer name) based upon the user input data, then, at operation 525, the server DPS transmits a small amount of code to the client DPS in reply, via a PM, indicating this. For example, the code may indicate that the CID input by the user does not correspond to a customer name. For one embodiment the code may activate a pop-up window displaying the non-corresponding information.

At operation 526, the focus is reset to the data input field and the data is selected.

If, at operation 520, the query does return a valid data (e.g., customer name), then, at operation 530, the server DPS transmits a small amount of code to the client DPS in reply, via a PM, containing the valid data (e.g., customer name).

At operation 535, the client DPS web browser receives the reply and provides the queried database data to the user for validation. For one embodiment the code may activate a pop-up window displaying the corresponding information. For example, the customer name corresponding to the entered CID is entered into a corresponding consult field so that the user can validate that it is the desired customer.

Refresh Process

For one embodiment, the system of the invention provides the ability for implementing a remote application form refresh process that reduces the amount of transmitted data. A PM is used to transmit a timestamp and session identification to the server DPS that indicates the last time the form was refreshed. The server DPS then transmits only the code necessary to call on the mini-assembler to construct the objects subsequent to the transmitted timestamp. If there are no new objects (i.e., subsequent to the time stamp), the server transmits a message to this effect. In this way, the client DPS does not repetition the entire form upon a refresh, thus substantially reducing the amount of data transmission versus prior art refresh processes.

Figure 6:
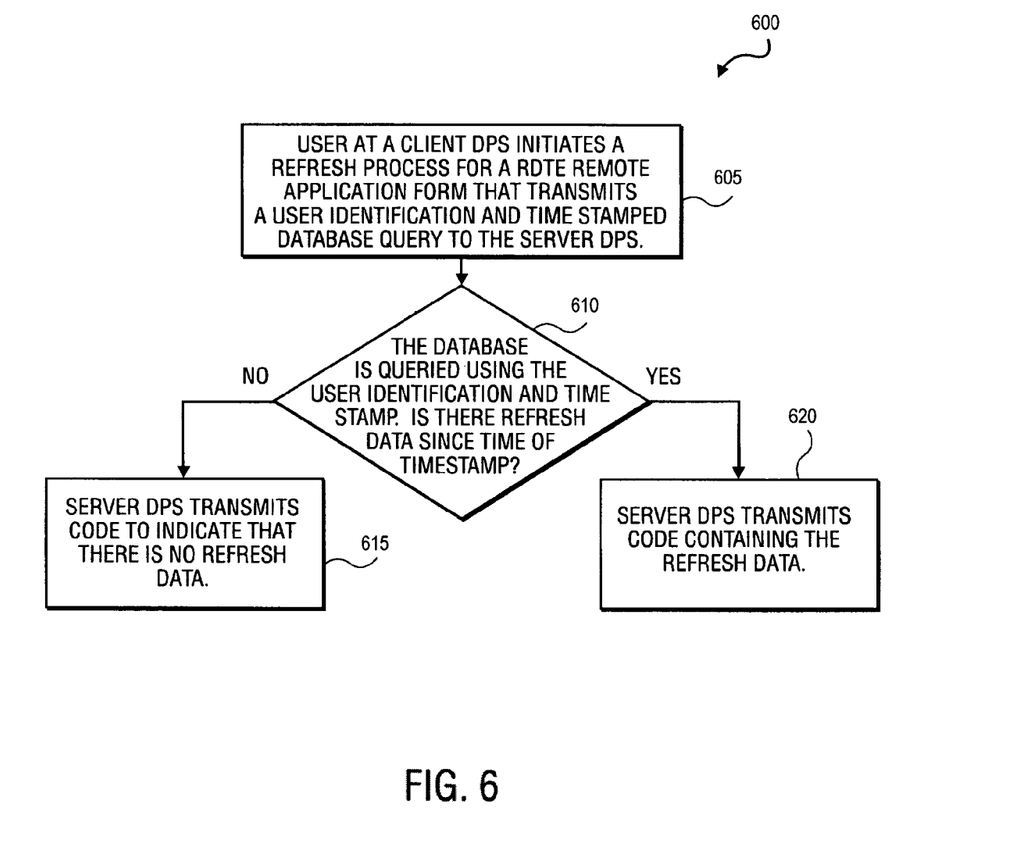

FIG. 6 is a process flow diagram illustrating a process in which a RDTE remote application form is refreshed in accordance with one embodiment of the invention. Process 600, shown in FIG. 6, begins with operation 605 in which a user initiates a refresh process for a RDTE remote application form that has already been accessed by the user and presented on a client DPS. For example, the user may be accessing an electronic mail form and may be initiating a refresh process to determine if there is new e-mail. The refresh process initiation uses a pacemaker to transmit the refresh request to the server DPS. The refresh request includes a session identification and a time stamp indicating the time of a last refresh process (i.e., since the last time the data was validated as current).

At operation 610, the database is queried using the user identification and time stamp to determine if there is refresh data for the particular user as of the transmitted time stamp.

At operation 615, if there is no refresh data (e.g., no new e-mail), the server DPS transmits code to provide a message to the client DPS to this effect. For one embodiment, the code transmitted by the server DPS activates a pop-up window on the client DPS informing the user that there is no new e-mail.

At operation 620, if there is refresh data, the server DPS transmits only a small amount of code, which includes the refresh data (e.g., new e-mail messages). The code activates a mini-assembler causing the refresh data to be added to the existing form (e.g., new e-mail messages are added to the in-box).

The use of PMs to validate data significantly reduces the amount of transmitted data and reduces the wait time upon form submittal over the prior art because the user input data has already been validated by the time the form is submitted. PMs provide another avenue for reducing the processing performed by the server DPS.

Data Type and Field Completion Validation Process

The various mini-assemblers may effect data transmission reduction processes, via object attributes (e.g., data type or required field attributes), by incorporating triggers into the objects. Such triggers may be used to effect client-side user input data type and required field completion validation and to provide a reduced data transmission refresh process as described below. For one embodiment, the system of the invention provides the ability for implementing a reduced data transmission validation process by including attributes to the objects as opposed to including the entire validation script as in prior art schemes. The validation process allows a user to verify that user-input data is valid and required fields are complete prior to transmission of the form to the server DPS. For one embodiment, the validation process validates user data input during form completion and validates required field completion on form submittal. Implementing such a validation process avoids the excessive data transmission of prior art schemes, which can amount to 2-3 times the amount of data transmissions for remote applications without data validation.

Figure 7:
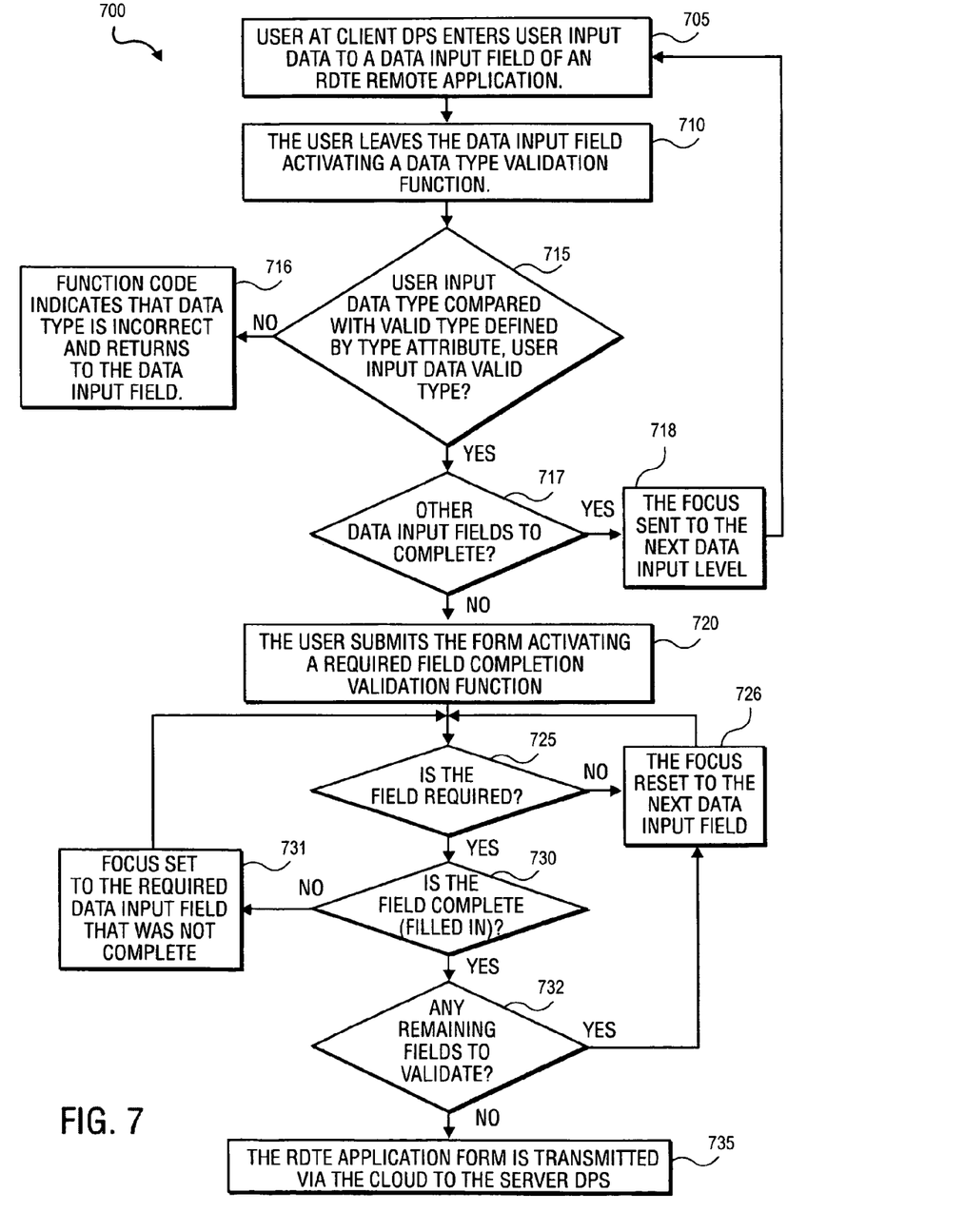

FIG. 7 is a process flow diagram illustrating a process in which user data input type validation and field completion validation are accomplished on the client DPS in accordance with one embodiment of the invention. Process 700, shown in FIG. 7, begins with operation 705 in which a user at a client DPS enters user-input data to a data input field of a RDTE remote application form that has already been accessed by the user and presented on a client DPS.

At operation 710, when the user leaves the data input field, an "onchange" trigger is activated. For one embodiment, the onChange trigger is inserted into the code by the mini-assembler that created the field. The onChange trigger activates a data type validation function contained in the RDTE core library.

At operation 715, the validation functions compare the type of the user-input data entered into the data input field with a valid data type as defined by a RDTE data-type attribute. For one embodiment, the data-type attribute is inserted into the code by the mini-assembler that created the field.

At operation 716, if the data type of the user-input data does not match the data type defined by the data type attribute, the code provides an indicator that the user-input data type is incorrect. The focus is then returned to the data input field and the data selected. For one embodiment, the invalid data indicator is implemented as pop-up window on the client DPS.

At operation 717, if the data type of the user-input data matches the data type defined by the data type attribute, the focus is sent to the next data input field, if any, and the process of data type validation is repeated iteratively, as necessary, for all data input fields.

At operation 720, after the last data input field has been validated, the user submits the form. The submittal activates an onSubmit trigger that activates a required field completion validation process contained in the RDTE core library. For one embodiment, the onSubmit trigger is inserted into the code by the mini-assembler that created the RDTE remote application form.

At operation 725, the required field validation process begins with the first data input field of the RDTE remote application form and determines if the field requires data input. For one embodiment, this determination is made by reference to a required field attribute inserted into the HTML object when the object was created by the mini-assembler.

At operation 726, if the field is not required, the process continues with the next data input field.

At operation 730, if the field is required, the required field validation process determines if the field has been filled in. The required field completion validation process is contained in the core library. If the required field has not been filled in, the submit process is cancelled and the code provides an indicator that a required field has not been filled in. For one embodiment, an incomplete required field indicator is implemented as pop-up window on the client DPS.

At operation 731, the focus is then set to the required field that was not filled in. This process of determining required fields and whether or not they have been filled in is repeated until all required fields are completed.

At operation 732, if the required data input field is complete, a determination is made if there are other fields to validate.

At operation 735, the RDTE remote application form is submitted from the client DPS to the server DPS via the cloud. Because the data has been validated for user-input data type and required field completion, the submittal process will not have to be repeated as is typical in prior art systems.

General Matters

Embodiments of the invention may be applied to reduce the amount of required data transmitted between the server DPS and the client DPS for a remote application while maintaining complete functionality. For one embodiment, when a client DPS accesses a remote application, the server DPS transmits a core library of functions, a set of which, known as GMAs, are then used to construct generic objects on the client DPS instead of the server DPS. The functions contain information on the physical characteristics of the objects as well as metadata regarding the data type of object to be constructed. For one embodiment, the core library and various other mini-assemblers are stored on the cache browser of the client DPS. Because there is no installation, the method of such an embodiment avoids breaching client DPS security and is not system specific.

Moreover, as shown in FIG. 3, the core library also includes user interface functions. These functions allow remote application forms to be presented in a much more user-friendly format than typical prior art schemes. For example, prior art schemes may require up to 40 lines of code to open a presentation object (e.g., a window). This restricts a programmer's ability to provide a user friendly look and feel for remote applications. The system and method of the invention provides greater flexibility in this area. The user interface functions contain a small amount of code that is used to call various HTML presentation objects. This allows a programmer to include a user-friendly "look and feel" without adding significantly to the amount of transmitted data.

The system and method in accordance with various embodiments of the invention provides dramatic bandwidth reduction for user-interactive remote applications, but is not limited to such and may be generally applied to any remote data access.

Figure 8:
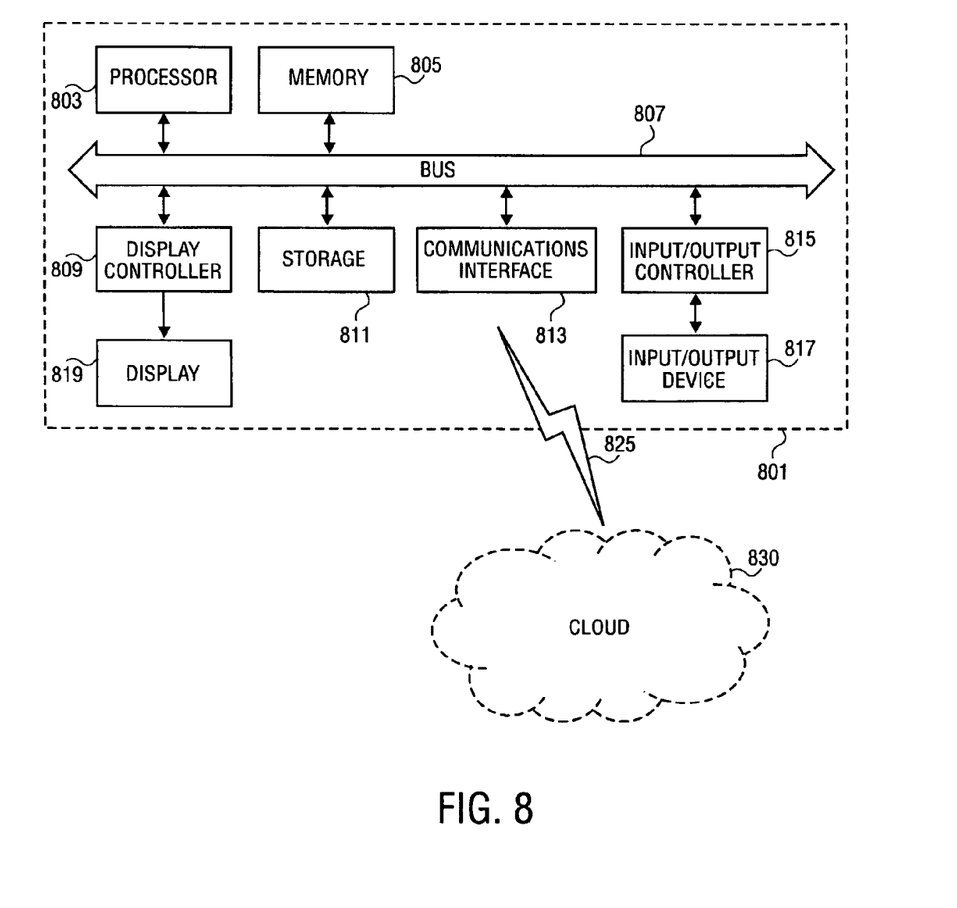

FIG. 8 illustrates an embodiment of a digital processing system that may be used for the server DPS 220, or client DPSs 205a-205d, in accordance with an embodiment of the invention. For alternative embodiments of the present invention, processing system 801 may be a computer or a set top box that includes a processor 803 coupled to a bus 807. In one embodiment, memory 805, storage 811, display controller 809, communications interface 813, and input/output controller 815 are also coupled to bus 807.

Processing system 801 interfaces to external systems through communications interface 813. Communications interface 813 may include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices. Communications interface 813 may also include a radio transceiver or wireless telephone signals, or the like.

For one embodiment of the present invention, communication signal 825 is received/transmitted between communications interface 813 and the cloud 830. In one embodiment of the present invention, a communication signal 825 may be used to interface processing system 801 with another computer system, a network hub, router or the like. In one embodiment of the present invention, communication signal 825 is considered to be machine readable media, which may be transmitted through wires, cables, optical fibers or through the atmosphere, or the like.

In one embodiment of the present invention, processor 803 may be a conventional microprocessor, such as, for example, but not limited to, an Intel x86 or Pentium family microprocessor, a Motorola family microprocessor, or the like. Memory 805 may be a machine-readable medium such as dynamic random access memory (DRAM) and may include static random access memory (SRAM). Display controller 809 controls in a conventional manner a display 819, which in one embodiment of the invention may be a cathode ray tube (CRT), a liquid crystal display (LCD), an active matrix display, a television monitor or the like. The input/output device 817 coupled to input/output controller 815 may be a keyboard, disk drive, printer, scanner and other input and output devices, including a mouse, trackball, trackpad, or the like.

tion or encoding a sequence of instructions for execution by processor 803 to cause processor 803 to perform the methodologies of the present invention. The term "machine readable medium" shall be taken to include, but is not limited to solid-state memories, optical and magnetic disks, carrier wave signals, and the like.

The invention includes various operations. The operations of the invention may be performed by hardware components or may be embodied in machine-executable instructions as described above. Alternatively, the steps may be performed by a combination of hardware and software. The invention may be provided as a computer program product that may include a machine-readable medium having stored thereon instructions, which may be used to program a computer (or other electronic devices) to perform a process according to the invention as described above.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

```
/*functions for creating the "input text" or "input password"*/
function CT(a,b,e)
{
DW(NB(1)+b[2]+'<input
'+(IB(e)?B:"type=password")+CL(b[7])+I(a)+(LL(d[1])?PO(d[1],c[1]):B)+INB('
I="',b[2],'"')+RQ(b[3])+' size='+b[4]*(b[4]<=20?1:NT)+INB(' maxlength="',b[5],'"')+'
t='+b[6]+' '+VAL(b[6],b[8],b[9]+'>');
}
function PO(a,b,c,d)
{
return((a!=""||b!="")?'STYLE="position:'+(IB(c)?'absolute;':'relative;')+(INB('left:',a,'
px;'+INB('top:',b,'px;')+RB(d)+'"'):IB(d)?'STYLE="position:relative"':STYLE'='"posit
ion:relative;'+d+'"');
}
function CL(a)
{return INB(" class=\"",a,"\" ")}
function VAL(a,b,c)
{
    var r;
        if(LL(a))
        {
            r = ' onfocus="if(Y(this.V)==\'undefined\')this.V=T" onchange="W.C
= T;this.V=VLT(this,\"+a+'\',F);'+B;
                                    if (LL(b))
                                            r += '((this.V) ? '+b+' : \'\')';
            r+= '" onblur="if (this.V == F) {this.focus(); this.select();}"'
        }
        else
            r = ' onchange="W.C = T;'+RB(b)+'" ';
        return r
}
/*code for creating a text input*/
CT("13","10^ " 90^ " Name:" T" 15" 15" 4","","i97");
```

Storage 811 may include machine-readable media such as, for example, but not limited to, a magnetic hard disk, a floppy disk, an optical disk, a smart card or another form of storage for data. In one embodiment of the present invention, storage 811 may include removable media, read-only media, readable/writable media or the like. Some of the data may be written by a direct memory access process into memory 805 during execution of software in computer system 801. It is appreciated that software may reside in storage 811, memory 805 or may be transmitted or received via modem or communications interface 813. For the purposes of the specification, the term "machine readable medium" shall be taken to include any medium that is capable of storing data, informa-

What is claimed is:

1. A method for constructing a Web page in a client comprising:
    receiving at a client HTML code relating to the Web page, said HTML code including a first call to a first function and a second call to a second function, each of said functions defined in a scripting language, said first function to create at least a first object on a Web page, said second function to create at least a second object on a Web page, said first call being to said first function to create said first object in a first portion of the Web page, said second call being to said second function to create said second object in a second portion of the Web page;

executing said first call to create said first object in said first portion;

subsequently executing said second call to create said second object in said second portion; and subsequently executing said first call again to create said first object in said first portion again.

2. The method of claim 1 wherein said first portion is a geographical subset of the Web page.

3. The method of claim 1 wherein said first portion is a set of objects on the Web page.

4. The method of claim 1 wherein said first portion is a set of variables on the Web page.

5. The method of claim 1 wherein each of said functions can be reached through the document's global contexts for the Web pages.

6. The method of claim 1, wherein said function definitions are included in an external file, further comprising:

receiving at the client said external file;

storing said external file in a browser cache of the client; and accessing said function definitions for said first function and said second function, which definitions have been made available from the browser cache.

7. The method of claim 6 wherein said HTML code includes a request for said external file, and further comprising:

before said receiving said external file, executing said request.

8. The method of claim 6 wherein said external file is stored in said browser cache separately from said HTML code.

9. A method for constructing a Web page in a client comprising:

receiving at the client HTML code relating to the Web page, said HTML code including at least one call to at least a first one of a plurality of functions defined in a scripting language, said first function being operable to create an object on a Web page, said call being to said first function to create said object in a portion of the Web page;

receiving at the client said function definitions;

storing said function definitions in a browser cache of said client;

executing said call to said first function to create said object in a portion of the Web page;

subsequently executing said call to said first function to create said first object in a portion of the Web page again; and accessing the function definition for said first function, which definition has been made available from the browser cache.

10. The method of claim 9, wherein said function definitions are included in an external file and said external file is stored in said browser cache separately from said HTML code.

11. The method of claim 9, wherein said portion is a geographical subset of the Web page.

12. The method of claim 9 wherein said portion is a set of objects on the Web page.

13. The method of claim 9 wherein said portion is a set of variables on the Web page.

14. The method of claim 9 wherein said first function can be reached through the document's global contexts for the Web pages.

15. The method of claim 9, wherein said function definitions are included in an external file and further comprising:

receiving at the client said external file;

storing said external file in a browser cache of the client; and accessing said function definition for said first function, which definition has been made available from the browser cache.

16. The method of claim 15 wherein said HTML code includes a request for said external file, and further comprising:

before said receiving said external file, executing said request.

17. The method of claim 15 wherein said external file is stored in said browser cache separately from said HTML code.

* * * * *